United States Patent [19]

Koch et al.

[11] Patent Number: 5,015,949
[45] Date of Patent: May 14, 1991

[54] STEAM TURBINE BLADE ARRIVAL TIME PROCESSOR WITH AUTOMATIC GAIN CONTROL

[75] Inventors: Karl C. Koch, Pittsburgh; Robert M. Oates, Murrysville Boro; Carlo F. Peteronio, Ross Township, Allegheny County; Charles W. Einolf, Jr., Murrysville, all of Pa.

[73] Assignee: Westinghouse Electric Corp., Pittsburgh, Pa.

[21] Appl. No.: 288,592

[22] Filed: Dec. 22, 1988

[51] Int. Cl.⁵ .............. G01H 11/02; G01B 7/14; H03K 5/153; H03L 5/00
[52] U.S. Cl. .................. 324/207.25; 73/660; 307/264; 307/354; 307/515; 307/520; 324/207.12; 324/207.15; 324/207.22; 328/110; 328/167; 328/168
[58] Field of Search ............. 324/207, 208, 173, 174, 324/225; 73/660, 661, 457; 340/683; 307/510, 514, 515, 516, 518, 520, 351, 354, 358, 264; 328/109, 110, 140, 165, 167, 168, 169, 172; 416/61

[56] References Cited

U.S. PATENT DOCUMENTS

| | | | |
|---|---|---|---|
| 3,715,659 | 2/1973 | Abnett et al. | 324/225 X |
| 3,908,167 | 9/1975 | Hulls et al. | 324/166 |
| 3,944,936 | 3/1976 | Pryor | 307/354 X |
| 3,995,224 | 11/1976 | Sutphin | 328/168 |
| 4,013,967 | 3/1977 | Fassbind | 328/140 X |
| 4,037,163 | 7/1977 | Nicholas | 328/168 X |
| 4,518,917 | 5/1985 | Oates et al. | 324/207 |
| 4,563,643 | 1/1986 | Leschek et al. | 324/207 |
| 4,573,358 | 3/1986 | Luongo | 73/660 |
| 4,593,566 | 6/1986 | Ellis | 73/660 |
| 4,609,869 | 9/1986 | Metcalf | 324/208 |
| 4,922,757 | 5/1990 | Rozelle et al. | 73/660 |

*Primary Examiner*—Gerard R. Strecker

[57] ABSTRACT

An apparatus for detecting turbine blade passing times includes a sensor for producing an input signal each time a blade passes the sensor. Automatic gain control circuitry including a digital multiplier, peak detector and error amplifier regulates the amplitude of the input signal. A zero-crossing detector produces an output signal each time the input signal crosses a reference axis. A pre-trigger comparator produces a gating signal coinciding with the expected arrival time of the blade at the sensor. A gating device is responsive to the gating signal for conducting output signals which occur during the expected arrival time of the blade at the sensor. A monostable vibrator produces a digital pulse coinciding with the time at which the blade passes the sensor.

11 Claims, 2 Drawing Sheets

STEAM TURBINE BLADE ARRIVAL TIME PROCESSOR WITH AUTOMATIC GAIN CONTROL

BACKGROUND OF THE INVENTION

1. Field of the Invention

The present invention is directed generally to sensors and more particularly to sensors used to detect vibrations in rotary machines.

2. Description of the Prior Art

Turbine blades, because of their complex design, can suffer from vibrations at frequencies which correspond to natural frequencies of the blades called modes. Each mode is associated with a different type of vibration such as along the rotational axis of the turbine, perpendicular to the rotational axis of the turbine, etc. In order to prevent excessive vibration of the blade about its normal position, normal design practice dictates that the blades be constructed such that these modes are located between harmonics of the operating frequency of the steam turbine. However, manufacturing tolerances, changes in blade attachment to the rotor, changes in blade geometry due to erosion and changes in the operating frequency of the turbine, among other factors, cause mode frequencies to approach harmonics of the operating frequency.

The approach of the modes to the harmonics of the operating frequency may result in physical damage to the steam turbine. When the amplitude of the vibration exceeds a certain level, objectionable stresses are set up in the blade. If the condition is not detected and remedied, the blade may eventually fracture resulting in an extremely costly forced outage of the machinery. Thus, a method for detecting this vibration is necessary in order to prevent such damage.

Historically, the vibrational modes of steam turbine blades have been measured by placing strain gages on the rotating blades and telemetering the information to a stationary receiver. This method suffers from three significant drawbacks. First, the strain gage has a very short life due to erosion caused by steam passing through the turbine blades. Second, each blade requires a strain gage if all blades in a row are to be monitored. Third, the complexity of continuously and reliably supplying power to the strain gage and transmitting the signal reliably from the rotating rotor disk to a stationary receiver creates severe difficulties. For these reasons, other types of sensors have been investigated.

The present application is related to co-pending U.S. application Ser. No. 205,770 entitled APPARATUS FOR PRECISE DETECTION OF BLADE PASSING TIMES filed June 13, 1988, now U.S. Pat. No. 4,922,757 and assigned to the same assignee as the present invention. U.S. application Ser. No. 205,770 is directed to an apparatus for detecting the passing of the blades of a rotating machine past a stationary sensor. The sensor produces an output signal each time a blade passes the sensor. A zero crossing detector produces an output signal each time the input signal crosses a reference axis. A phase shifter shifts the phase of the input signal to produce a gating signal coinciding with the expected arrival time of the blade at the sensor. A gating device is responsive to the gating signal for conducting output signals which occur during the expected arrival time of the blade at the sensor.

The invention disclosed in U.S. application Ser. No. 205,770 requires that the circuitry be calibrated to operate in conjunction with any particular sensor that is used with the apparatus. This calibration is necessary both because of the different characteristic signal amplitudes associated with any particular sensor and because the signal amplitudes also depend upon the distance between the turbine blade tip and the surface of the sensor. In addition, this apparatus is sensitive to the frequency of the input signal and thus must be designed for signals of any one particular frequency range.

Thus, there is a need for a turbine blade arrival time processor which can compensate automatically for differences in input signal amplitude and is not sensitive to input signal frequency.

SUMMARY OF THE INVENTION

The present invention is directed to an apparatus for detecting the passing of the turbine blades of a rotating machine past a stationary sensor. The sensor produces an input signal each time a blade passes the sensor. Automatic gain control circuitry regulates the amplitude of the input signal. The automatic gain control circuitry includes a digital multiplier, a peak detector and an error amplifier. A zero-crossing detector produces an output signal each time the input signal crosses a reference axis. A pre-trigger comparator produces a gating signal coinciding with the expected arrival time of the blade at the sensor. A gating device is responsive to the gating signal for conducting output signals which occur during the expected arrival time of the blade at the sensor. A monostable vibrator produces a digital pulse coinciding with the time at which the blade passes the sensor.

The present invention is also directed to a method of detecting the passing of the blades of a rotating machine past a stationary sensor. The method includes the step of producing an input signal each time a blade passes a stationary sensor. The amplitude of the input signal is regulated. An output signal is produced each time the input signal crosses a reference axis. A gating signal is produced which coincides with the expected arrival time of the blade at the sensor. The output signal is selectively conducted in response to the gating signal. A digital pulse is produced which coincides with the time at which a blade passes the sensor.

The present invention incorporates the features of automatic gain control for the input signal and means for digitally producing a "time of arrival" signal which is independent of the frequency of the input signal. These and other advantages and benefits of the present invention will become apparent from a description of a preferred embodiment hereinbelow.

BRIEF DESCRIPTION OF THE DRAWINGS

In order that the present invention may be clearly understood and readily practiced, a preferred embodiment will now be described, by way of example only, with reference to the accompanying figures wherein.

DETAILED DESCRIPTION OF THE PREFERRED EMBODIMENT

Figure 1:
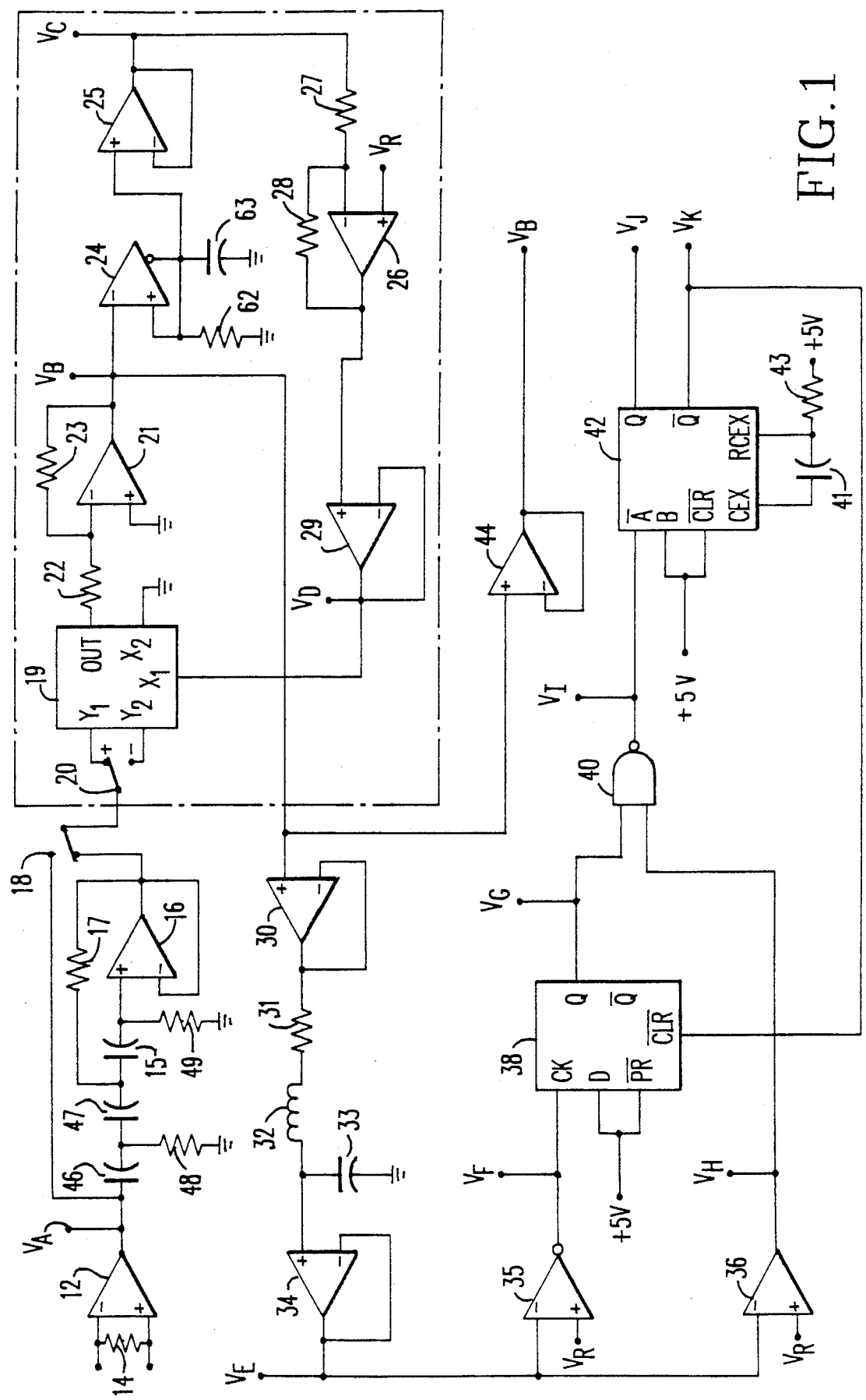
FIG. 1 illustrates a circuit constructed according to the teachings of the present invention for processing the signals produced by a magnetic sensor.

FIG. 1 illustrates a simplified circuit diagram for an apparatus 10 associated with a turbine blade arrival time processor of the present invention. The apparatus 10 functions to automatically regulate the amplitude of input signals and then to process these regulated input signals in order to discern the time at which a "turbine blade arrival" event occurs. Automatic gain control circuitry which functions to regulate the amplitude of the input signals is shown inside the dotted lines of FIG. 1 while signal processing circuitry is shown outside of the dotted lines.

Figure 3:
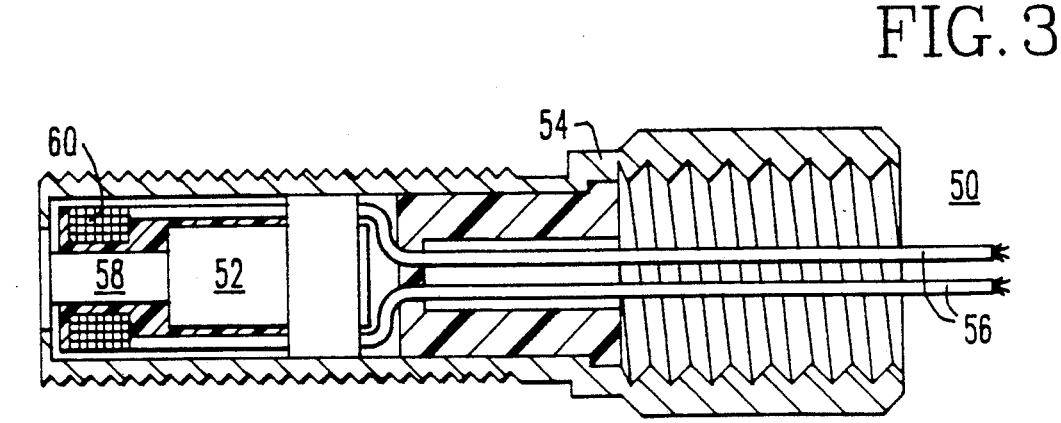
FIG. 3 illustrates a typical magnetic sensor.

A signal generated by a magnetic sensor 50, such as shown in FIG. 3, is input across an inverting and a noninverting input terminal of a differential amplifier 12. One type of differential amplifier which may be used in the apparatus 10 of this invention is component INA117 available from Burr-Brown Corporation. An impedance matching resistor 14 is also connected across the inverting and noninverting inputs of differential amplifier 12. A voltage signal $V_A$ is available at an output terminal of the differential amplifier 12.

Voltage signal $V_A$ is input to a noninverting input of operational amplifier 16 through the RC network consisting of capacitors 15, 46 and 47 and resistors 48 and 49. The capacitors 15, 46 and 47 are connected in series between the output terminal of the differential amplifier 12 and the noninverting input of operational amplifier 16. Resistor 48 is connected from the anode of capacitor 47 to ground while resistor 49 is connected from the cathode of capacitor 15 to ground. An output terminal of operational amplifier 16 is connected to an inverting input of operational amplifier 16 and is also connected through resistor 17 to an anode of capacitor 15. Operational amplifier 16 functions as a high-pass filter to reject any 60 Hz components which may be coupled to the input signal. The high-pass filter 16 can be either closed into the circuit or removed from the circuit by moving switch 18 to the appropriate position. One type of operational amplifier which may be used for the high-pass filter 16 is component LF347 available from National Semiconductor.

A voltage signal available at an output of the high-pass filter 16 is input to either a $Y_1$ or a $Y_2$ input of a multiplier 19 by positioning a switch 20 in the proper position. The use of the switch 20 to route the output signal of high-pass filter 16 to either the $Y_1$ or the $Y_2$ input terminal of multiplier 19 provides the capability of inverting the input signal and is a convenient method of effectively changing the polarity of sensor 50 without the need for rewiring. Input $X_1$ of multiplier 19 is connected to an output terminal of buffer 29 while input terminal $X_2$ is connected to ground. One type of multiplier 19 which may be used in the apparatus 10 of this invention is component AD532 available from Analog Devices.

A voltage signal available at an output terminal of multiplier 19 is input through resistor 22 to an inverting input of operational amplifier 21. A noninverting input of operational amplifier 21 is connected to ground while an output terminal of operational amplifier 21 is connected through resistor 23 to the inverting input of operational amplifier 21. Operational amplifier 21 acts as an inverting amplifier and through the proper selection of resistors 22 and 23 may exhibit a gain of 20. One type of operational amplifier which may be used for inverting amplifier 21 in the apparatus 10 of this invention is component LF347. A voltage signal $V_B$ is available at an output terminal of inverting amplifier 21.

Voltage signal $V_B$ is input to an inverting input of comparator 24 which is designed to act as a peak detector. A noninverting input of comparator 24 is connected through resistor 62 to ground. The noninverting input of comparator 24 is also connected to both an inverting output of comparator 24 and through capacitor 63 to ground. One type of device which may be used for the peak detector 24 is component LM311 available from National Semiconductor.

An inverted output signal of peak detector 24 is input to a noninverting input of operational amplifier 25 which acts as a buffer. An ouput terminal of operational amplifier 25 is connected to an inverting input of operational amplifier 25. Component LF347 is one type of operational amplifier which may be used for buffer 25. A voltage signal $V_C$ is available at an output terminal of buffer 25.

Voltage signal $V_C$ is input through resistor 27 to an inverting input of an operational amplifier 26 which acts as an error amplifier. A noninverting input of operational amplifier 26 is connected to a reference voltage $V_R$ of, for example, +5 volts DC. An ouput of operational amplifier 26 is connected through resistor 28 to the inverting input of operational amplifier 26. Error amplifier 26 may exhibit a gain of 20 through the proper selection of resistors 27 and 28. One type of device which may be used for error amplifier 26 is component LF347.

A signal available at the output of the error amplifier 26 is input to a noninverting input of operational amplifier 29 which acts as a buffer. An ouput terminal of operational amplifier 29 is connected to an inverting input of operational amplifier 29. A voltage signal $V_D$ available at an output of buffer 29 is input to the $X_1$ terminal of multiplier 19. One type of device which may be used for buffer 29 is component LF347.

Voltage signal $V_B$ available at the output of inverting amplifier 21 is input to a noninverting input of operational amplifier 30 which acts as a buffer. An output terminal of operational amplifier 30 is connected to an inverting input of operational amplifier 30. A voltage signal available at the output terminal of operational amplifier 30 is input to an R-L-C network consisting of resistor 31, inductor 32 and capacitor 33. This R-L-C network is likewise connected to a noninverting input of operational amplifier 34 which acts as a buffer. An output terminal of operational amplifier 34 is connected to an inverting input of operational amplifier 34. The series combination of the R-L-C network and buffer 34 functions as a low-pass filter to reduce high-frequency noise. Component LF347 may be used for both buffers 30 and 34.

Voltage signal $V_B$ is also input to the noninverting input of operational amplifier 44 which acts as a buffer. An output terminal of operational amplifier 44 is connected to an inverting input of operational amplifier 44. Voltage signal $V_B$ is available for monitoring at an output terminal of buffer device 44. Component LF347 may be used for buffer device 44.

A voltage signal $V_E$ available at an output terminal of buffer 34 is input to inverting inputs of both comparators 35 and 36. Comparator 35 functions as a pretrigger comparator while comparator 36 functions as a zero-crossing comparator. A noninverting input of comparator 35 is connected to a reference voltage $V_R$ of, for example, +1.2 volts DC. A noninverting input of comparator 36 is connected to a reference voltage $V_R$ of, for example, −0.12 volts DC. Voltage comparator device LM360 available from National Semiconductor may be used for both pre-trigger comparator 35 and zero-crossing comparator 36.

A voltage signal $V_F$ available at an output terminal of pre-trigger comparator 35 is input to a clock input terminal of pre-trigger flip-flop 38. Device 74LS74A available from Texas Instruments may be used for pretrigger flip-flop 38. Both a preset terminal and a D terminal of pre-trigger flip-flop 38 are tied to +5 volts DC. A voltage signal $V_G$ available at a Q output of pretrigger flip-flop 38 is an input to NAND gate 40. Device 74LS00 available from Texas Instruments may be used for NAND gate 40. A voltage signal $V_H$ available at an ouput terminal of zero-crossing comparator 36 is a second input to NAND gate 40.

A voltage signal $V_I$ available at an output of NAND gate 40 is input to an $\overline{A}$ input of monostable 42. Device 74LS221 available from Texas Instruments may be used for monostable 42. Both a clear input and a B input of monostable 42 are tied to +5 volts DC. A voltage signal $V_K$ available at a $\overline{Q}$ output of monostable 42 is input to a clear terminal of pre-trigger flip-flop 38. A capacitor 41 is connected in parallel to CEX and RCEX terminals of monostable 42 while resistor 43 is connected between the RCEX terminal of monostable 42 and a voltage source of +5 volts DC. A voltage signal $V_J$ is available at a Q output of monostable 42.

In operation, the filtered input signal $V_A$ is input to automatic gain control circuitry shown within the dotted lines of FIG. 1 which consists of multiplier 19, inverting amplifier 21, peak detector 24, buffers 25 and 29 and error amplifier 26. The automatic gain control circuitry functions to regulate the amplitude of voltage signal $V_B$ at a nominal 10 volt peak-to-peak level. Analysis shows that the automatic gain control circuitry exhibits a transfer function which can be represented by the following equation:

$$|V_B| = \left(\frac{1+\beta}{\beta}\right) V_R \left(\frac{|V_A|}{|V_A| + \frac{10}{\alpha\beta}}\right)$$

where $|V_B|$ = absolute value of the peak value of voltage signal $V_B$;

$|V_A|$ = absolute value of the peak value of voltage signal $V_A$;

$\alpha$ = dimensionless ratio of the resistance values in ohms of resistor 23 to resistor 22;

$\beta$ = dimensionless ratio of the resistance values in ohms of resistor 28 to resistor 27;

$V_R$ = reference voltage at the noninverting input of error amplifier 26.

By way of example of the operation of the automatic gain control circuitry, let $\alpha = \beta = 20$ and let $V_R = +5$ volts DC. The above equation can be simplified as follows:

$$|V_B| = 5.25 \left(\frac{|V_A|}{|V_A| + 0.025}\right)$$

For $|V_A| >> 0.025$ volts, $|V_B|$ is very nearly equal to 5.25 volts. For example, if $|V_A| = 1$ volt, then $|V_B| = 5.122$ volts; if $|V_A| = 10$ volts, then $|V_B| = 5.2369$ volts. The preceding example demonstrates that the amplitude of the voltage $V_B$ remains within 2.5% of 5.25 volts for a 10:1 variation in the amplitude of $V_A$.

Figure 2:
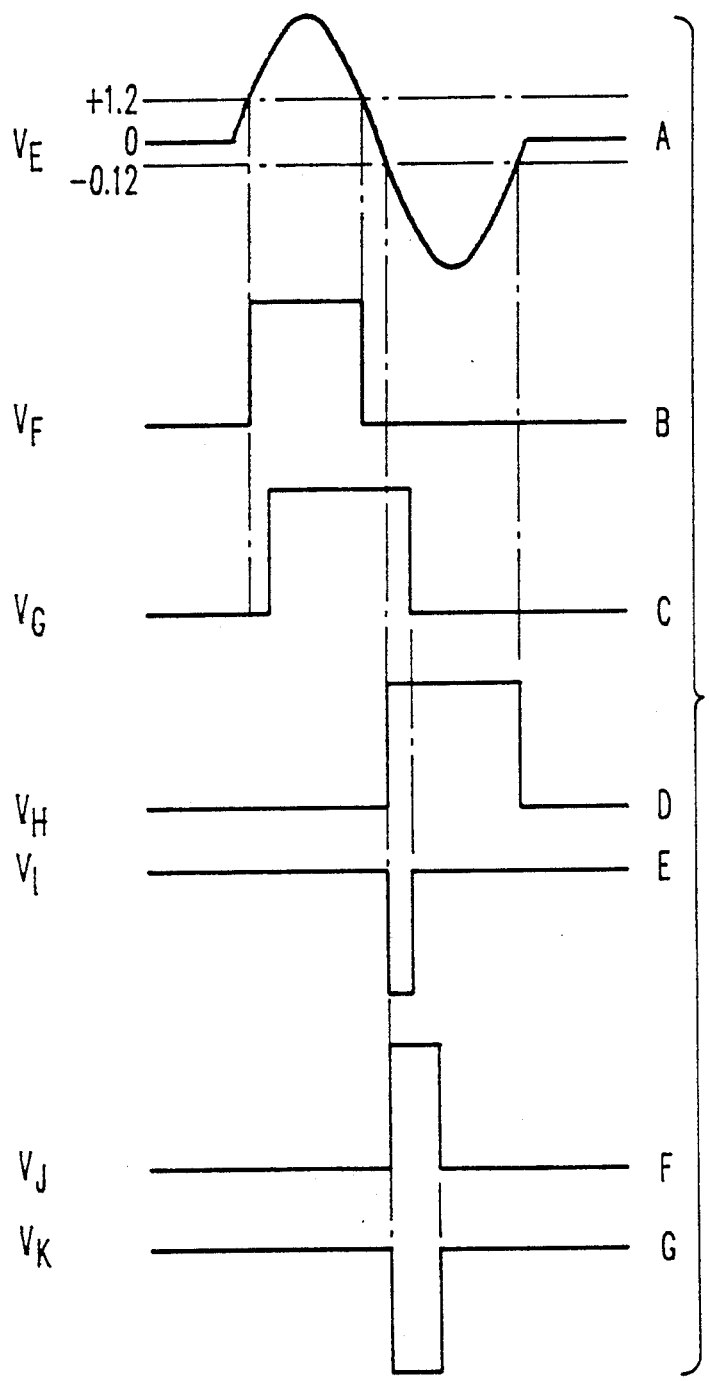
FIGS. 2A–2G illustrate the plots of various signals useful in explaining the operation of the circuit shown in FIG. 1.

The voltage signal $V_B$ is then buffered by device 30 and input to a low-pass filter to reduce high-frequency noise. The resulting voltage signal $V_E$ is illustrated in FIG. 2A. Voltage signal $V_E$ is then compared by pre-trigger comparator 35 to a positive reference voltage of, for example, +1.2 volts DC. The voltage signal $V_F$ at the inverted ouput terminal of pre-trigger comparator 35 corresponds to a logic level "1" whenever voltage signal $V_E$ is greater than 1.2 volts. Voltage signal $V_F$ is illustrated in FIG. 2B.

Voltage signal $V_F$ serves as the clock input to positive-edge triggered flip-flop 38. The D input and preset input are both always tied to a logic "1" level. When voltage signal $V_F$ goes "high," the Q output of flip-flop 38 (voltage signal $V_G$) also goes "high." The slight delay between the rising edges of these signals corresponds to the propagation delay of flip-flop 38. Voltage signal $V_G$ is illustrated in FIG. 2C.

Voltage signal $V_E$ is also input to zero-crossing comparator 36 where it is compared to a negative reference voltage of, for example, −0.12 volts DC. The voltage signal $V_H$ at the output terminal of zero-crossing detector 36 corresponds to a logic level "1" whenever voltage signal $V_E$ is less than −0.12 volts. Voltage signal $V_H$ is illustrated in FIG. 2D.

The voltage signal $V_I$ goes "low" whenever both inputs $V_G$ and $V_H$ are at the logic "1" level. Voltage signal $V_I$ is illustrated in FIG. 2E. The falling edge of voltage signal $V_I$ which is input to the $\overline{A}$ terminal of monostable 42 causes the Q output of monostable 42 (voltage signal $V_J$) to go "high" and the $\overline{Q}$ output (voltage signal $V_K$) to go "low." The width of these signals $V_J$ and $V_K$ is approximately equal to 0.7μ sec. This pulse width is determined by the values of capacitor 41 and resistor 43. Voltage signals $V_J$ and $V_K$ are illustrated in FIGS. 2F and G, respectively.

The voltage signal $V_J$ is input to processing circuitry (not shown) for determining turbine blade vibration in a known manner. The voltage signal $V_K$ is input to the clear terminal of flip-flop 38 to cause voltage signal $V_G$ to return to a logic "0" level.

The design of the circuit 10 of the present invention prevents the erratic triggering of the "time of arrival" pulse $V_J$ due to variations in input signal $V_A$ amplitude and the presence of noise on the input signal $V_A$. First, the automatic gain control circuitry previously described regulates the amplitude of voltage signal $V_E$ at a nominal peak-to-peak value. Second, the rising edge of voltage signal $V_H$ (the rising edge of voltage signal $V_H$ corresponds to the time that voltage signal $V_E$ crosses the reference voltage of −0.12 volts when voltage signal $V_E$ is decreasing in value which in turn corresponds to the time at which a turbine blade passes magnetic sensor 50) is only permitted to trigger monostable 42 in order to produce the pulse on voltage signal $V_J$ when voltage signal $V_G$ is at a logic "1" level. Voltage signal $V_G$ goes to a logic "1" level only when voltage signal $V_E$ crosses the +1.2 volt reference axis at a time when voltage signal $V_E$ is increasing in value. Thus, the circuit 10 of the present invention anticipates the time when voltage signal $V_E$ will cross the −0.12 volt reference axis in response to a turbine blade passing the magnetic sensor 50 by first detecting the positive portion of the sinusoid of voltage signal $V_E$. Any noise which erratically causes voltage signal $V_E$ to cross the −0.12 volt reference axis will not, thus, erroneously produce a pulse on voltage signal $V_J$ and provide incorrect turbine blade "time of arrival" data.

The circuit 10 of the present invention is also designed such that its operation is not sensitive to the frequency of the input signal $V_A$. The voltage signal $V_G$, produced by flip-flop 38 which anticipates the "time of arrival" of a turbine blade at the magnetic sensor 50, is triggered when voltage signal $V_E$ crosses the +1.2 volt reference axis at a time when voltage signal $V_E$ is increasing in value and is entirely independent of the frequency of the input signal $V_A$.

A sensor 50 which can be used in combination with the circuit 10 of FIG. 1 is illustrated in FIG. 3. The magnetic sensor 50 is a self-generating, variable-reluctance transducer which does not require a power supply. Such sensors are often used for measuring rotational speed by counting the teeth on a gear. Appropriate sensors are commercially available and can be obtained in a variety of configurations and package designs for particular applications.

The sensors used in combination with the present invention, have, for example, a very high strength magnet 52. The sensor housing 54 may be machined from a single piece of stainless steel bar stock, which is enclosed by EB welding to special hermetically sealed connectors 56. The magnet 52 operates in conjunction with a pole piece 58. A pick-up coil 60 produces a signal which is conducted by signal wires to the differential amplifier 12 of FIG. 1.

The internals of the sensor 50 should be suitable for operation at 550 F. (287.8 C.). Such sensors can be obtained from Airpax, a division of North American Phillips or Electro-Products. The mounting of sensors, such as sensor 50, in a turbomachine is well known. See for example U.S. Pat. No. 4,573,358 issued Mar. 4, 1986 to Luongo. Sensor to surface distances may vary between 150 to 250 mils (0.0381 to 0.0635 mm).

While the present invention has been described in connection with an exemplary embodiment thereof, it will be understood that many modifications and variations will be readily apparent to those of ordinary skill in the art. This disclosure and the following claims are intended to cover all such modifications and variations.

What is claimed is:

1. An apparatus for precisely detecting the passing of an individual blade of a rotating machine past a stationary sensor, comprising;
   stationary magnetic sensor means for producing an input signal of substantially constant magnitude each time the blade passes said sensor means;
   automatic gain control means responsive to said input signal for regulating the amplitude of said input signal to a predefined nominal value;
   zero-crossing detection means for producing an output signal in response to said regulated input signal each time said regulated input signal crosses a reference axis;
   means for producing a gating signal coinciding with an expected arrival time of the blade at said sensor means wherein said means for producing said gating signal includes a first comparator for receiving said regulated input signal at a first input terminal thereof and for receiving a first reference signal at a second input terminal thereof, said gating signal being available at an output terminal thereof;
   gate means responsive to said gating signal for conducting said output signal which occurs during the expected arrival time of the blade at said sensor means;
   flip-flop means for propagating said gating signal to said gate means until such a time as said flip-flop means is cleared; and
   means responsive to said conducted output signal for producing a pulse coinciding with the time at which the blade passes said sensor means.

2. The apparatus of claim 1 wherein said automatic gain control means includes a digital multiplier.

3. The apparatus of claim 2 wherein said automatic gain control means further includes peak detector means for producing a peak detector output signal representative of the amplitude of said input signal as multiplied by said digital multiplier.

4. The apparatus of claim 3 wherein said peak detector means includes a comparator.

5. The apparatus of claim 3 wherein said automatic gain control means further includes error amplifier means for producing an error amplifier output signal representative of the difference between said peak detector output signal and an error amplifier reference signal.

6. The apparatus of claim 5 wherein said error amplifier means includes an operational amplifier.

7. The apparatus of claim 1 wherein said zero-crossing detection means includes a second comparator for receiving said regulated input signal at a first input terminal thereof and for receiving a second reference signal at a second input terminal thereof, said output signal being available at an output terminal thereof.

8. The apparatus of claim 7 wherein said gate means includes a digital logic gate.

9. The apparatus of claim 8 wherein said logic gate includes a NAND gate.

10. The apparatus of claim 9 wherein said means for producing said pulse includes a monostable vibrator.

11. An apparatus for precisely detecting the passing of an individual blade of a rotating machine past a stationary sensor, comprising:
   stationary magnetic sensor means for producing an input signal of substantially constant magnitude each time the blade passes said sensor means;
   automatic gain control means responsive to said input signal for regulating the amplitude of said input signal to a predefined nominal value;
   zero-crossing detection means for producing a digital output signal in response to said regulated input signal each time said regulated input signal crosses a reference axis;
   means for producing a digital gating signal coinciding with an expected arrival time of the blade at said sensor means wherein said means for producing said digital gating signal includes a first comparator for receiving said regulated input signal at a first input terminal thereof and for receiving a first reference signal at a second input terminal thereof, said digital gating signal being available at an output terminal thereof;
   gate means responsive to said digital gating signal for conducting said digital output signal which occurs during the expected arrival time of the blade at said sensor means;
   flip-flop means for propagating said digital gating signal to said gate means until such time as said flip-flop means is cleared; and
   means responsive to said conducted output signal for producing a digital pulse coinciding with the time at which the blade passes said sensor means.

* * * * *